Figure 1:
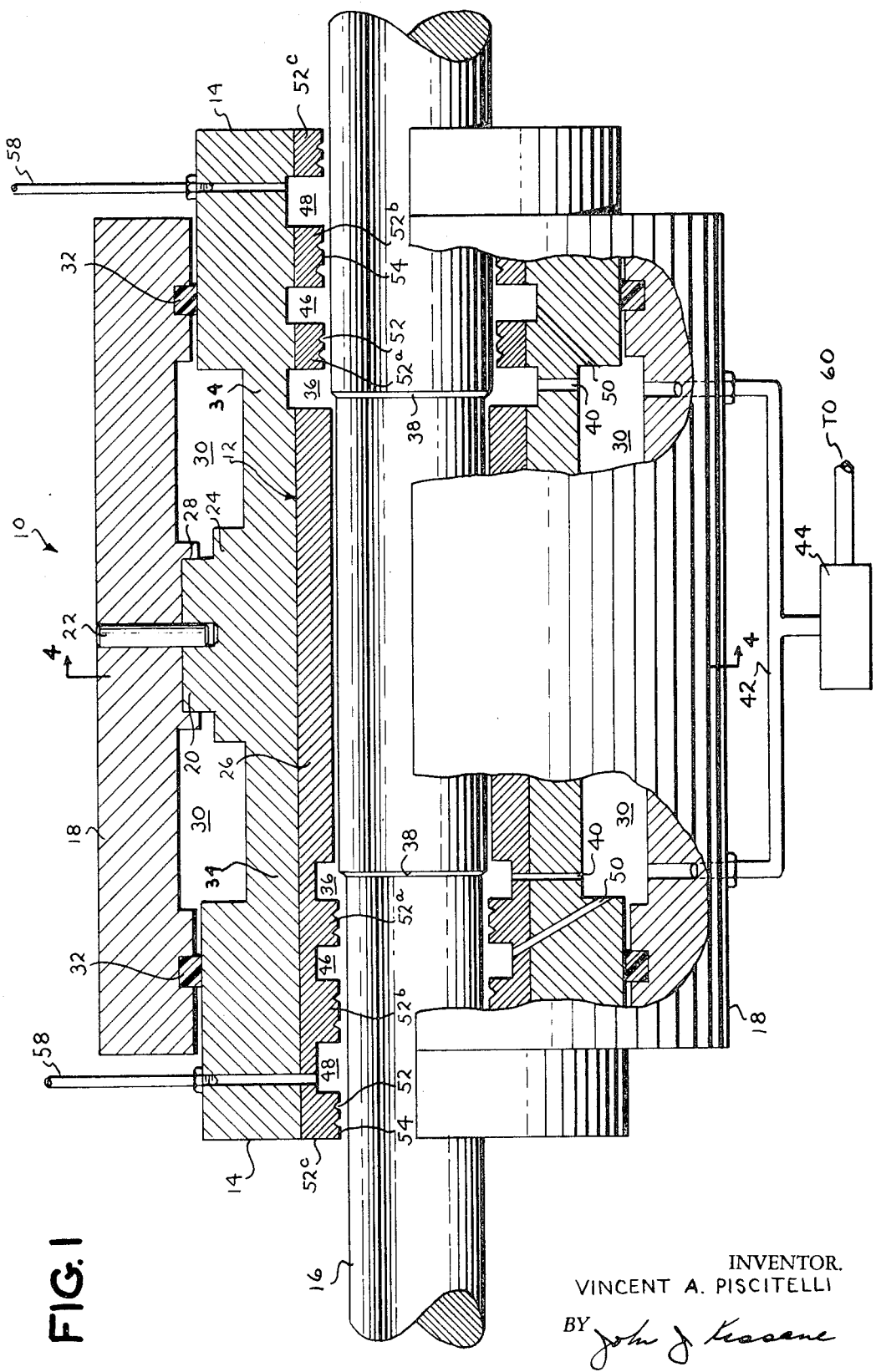

United States Patent [19]
Piscitelli

[11] 3,734,580
[45] May 22, 1973

[54] SPLIT SLEEVE BEARING WITH INTEGRAL SEALS

[75] Inventor: Vincent Americo Piscitelli, Schenectady, N.Y.

[73] Assignee: General Electric Company, Schenectady, N.Y.

[22] Filed: June 22, 1971

[21] Appl. No.: 155,544

[52] U.S. Cl. .................................. 308/36.3, 277/15
[51] Int. Cl. ............................................... F16c 33/74
[58] Field of Search ................... 308/36.3; 277/15, 277/25, 67, 133

[56] References Cited
UNITED STATES PATENTS

| | | | |
|---|---|---|---|
| 2,299,119 | 10/1942 | Yeomans | 308/36.3 |
| 2,899,245 | 8/1959 | Michel | 308/36.3 |
| 2,891,808 | 6/1959 | Richardson | 277/67 |
| 2,125,446 | 8/1938 | Hurtt | 308/36.3 |
| 2,347,296 | 4/1944 | Starr | 277/15 |
| 2,714,045 | 7/1955 | Simenson | 308/36.3 |
| 2,965,398 | 12/1960 | Keller et al. | 277/15 |
| 3,302,951 | 2/1967 | Olesen | 277/15 |
| 3,131,939 | 5/1964 | Cuny | 277/15 |
| 3,452,839 | 7/1969 | Swearingen | 308/36.3 |

Primary Examiner—Charles J. Myhre
Assistant Examiner—Barry Grossman
Attorney—John J. Kissane et al.

[57] ABSTRACT

An axially split sleeve bearing is described wherein the housing seal is formed integrally with the bearing to inhibit oil leakage by permitting a reduction in the normally required clearance between the housing seal and the shaft. An axially split bearing support circumferentially encloses the composite bearing and housing seal and is spaced therefrom to form dual annular passageways for removal of oil passing axially from the bearing section into the adjacent housing seals. The housing seal also is provided with air locks, i.e., annular air chambers having a cross-sectional area at least five-fold the circumferential area of clearance between the shaft and housing seal, to inhibit flow of oil through the housing seals at each end of the bearing. When the outboard end of the motor is readily accessible, the split sleeve bearing preferably has an integral housing seal only at the inboard end of the bearing with the outboard seal for the bearing being a conventional unitary housing seal secured to the bearing support.

2 Claims, 5 Drawing Figures

PATENTED MAY 22 1973 3,734,580

SHEET 2 OF 3

SPLIT SLEEVE BEARING WITH INTEGRAL SEALS

This invention relates to split sleeve bearings and more particularly, to a split sleeve bearing having an integral housing seal.

In rotating machinery wherein a rotary shaft is supported within a bearing spaced therefrom by a predetermined clearance (as opposed to a rubbing contact type of operation), leakage of oil can tend to occur at the bearing/shaft interface. To inhibit loss of oil from the bearing, oil collector grooves heretofore have been machined into the interior face of the bearing adjacent the ends of the bearing and housing seals have been secured to opposite ends of the bearing support, typically by machine screws passing through holes in the seal flange into threaded apertures in the bearing support. The lower faces of the housing seals conventionally are circumferentially disposed at a relatively close tolerance about the shaft and expansion grooves are formed within the annular face of the housing seal proximate the shaft to enhance the removal of oil flowing axially along the shaft from the bearing edges. When the bearing and housing seals are axially split (as is desirable to facilitate the removal of these components during servicing), the probability of adjacent edges of all semicylindrical split components abutting over the entire radial span of the edges is reduced by the large number of split components to be aligned. Moreover, because the holes in the housing seal flange must be sufficiently large to readily accept the screws passing therethrough, there often is some "play" on the positioning of the housing seals and alignment of the individual components forming the bearings and seals in a concentric attitude about the shaft often is difficult (especially when the shaft is stepped to limit axial movement of the rotor). Because of the difficulty in obtaining concentric alignment of the components, greater clearance generally is provided between the shaft and the housing seals then normally would be required for efficient seal operation.

It is therefore an object of this invention to provide a novel split sleeve bearing having an integral housing seal permitting reduction in the normally required clearance between the shaft and the housing seal.

It is also an object of this invention to provide a composite sealed bearing which can be readily manufactured and assembled.

It is a still further object of this invention to provide a composite sealed bearing having high pressure zones at the seal periphery to reduce loss of lubricant from the bearing.

These and other objects of this invention generally are achieved by a split sleeve bearing characterized by a bearing section having an internal cylindrical surface circumferentially disposed about a portion of a rotatable shaft and a housing seal section integrally formed with the bearing section to provide a plurality of annular grooves for removal of lubricating oil flowing axially from the bearing section. The split sleeve bearing also contains means for introducing a lubricant through the bearing section into the annular region between the bearing section and the shaft, as well as means for removing lubricant from the annular channel within the sleeve section of the composite unit. Preferably, the housing seal sections are integrally formed at each end of the bearing section and a pressure equalizing zone is provided at the end of each housing seal section remote from the bearing section to confine the lubricant within the composite bearing/seal. When the outboard end of the machine is readily accessible, a conventional housing seal secured to the bearing support is employed to prevent external leakage of lubricant with leakage of lubricant into the motor being inhibited by a housing seal formed integrally with the bearing section.

Figure 2:
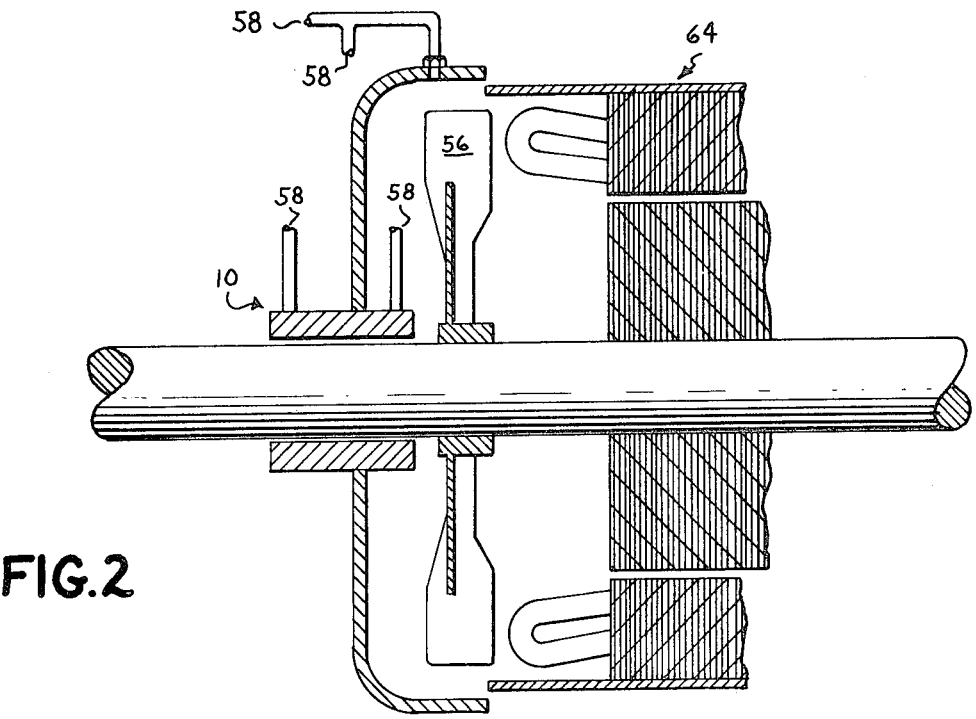
Figure 3:
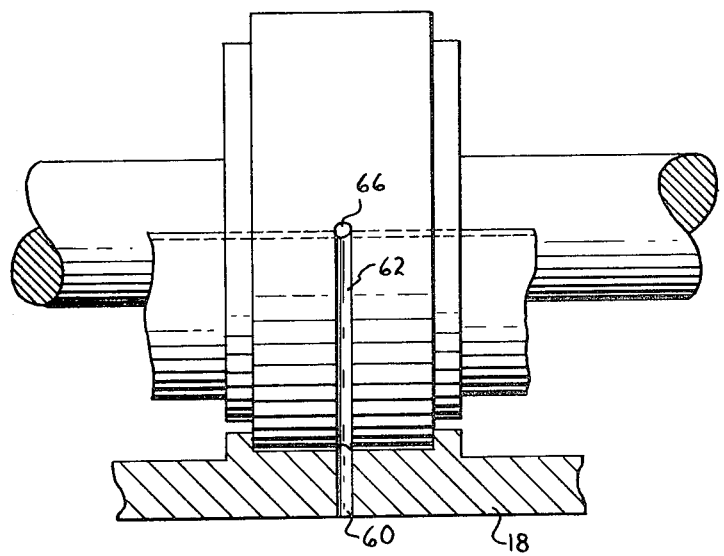
Figure 4:
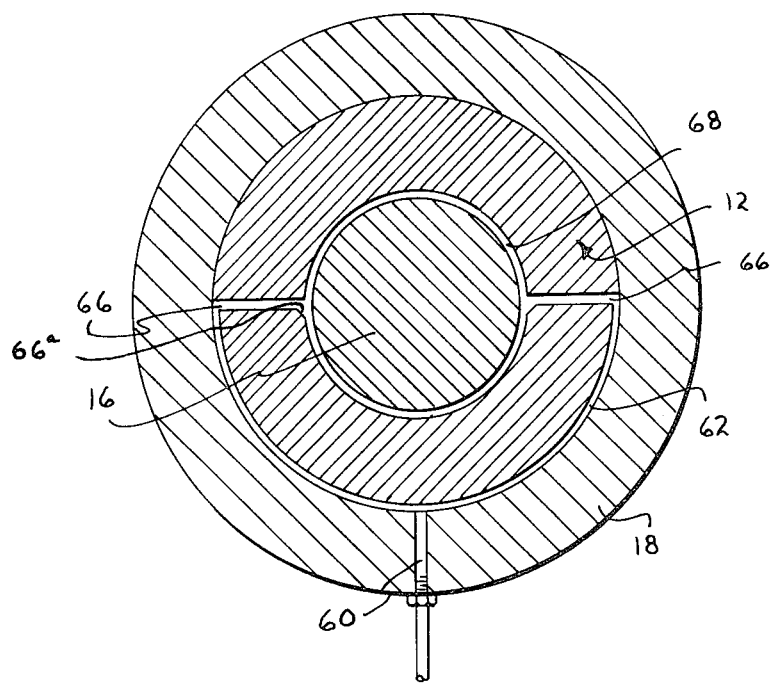
Figure 5:
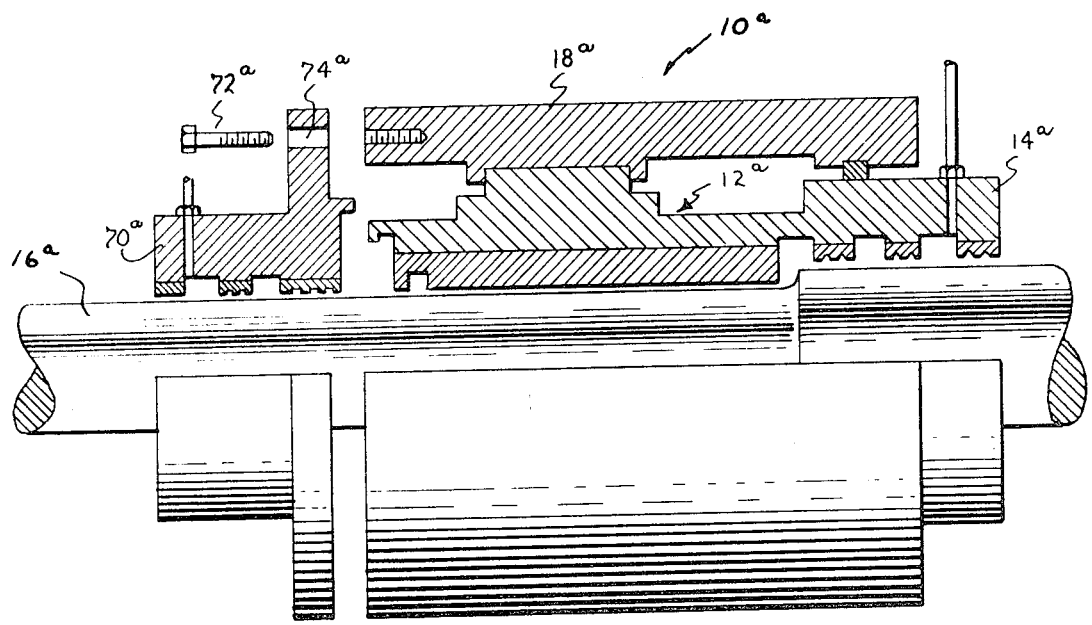

Although the split sleeve bearing of this invention is described with particularity in the appended claims, a more complete understanding of the invention itself may be obtained from the following detailed description of various specific embodiments of split sleeve bearings formed in accordance with this invention when taken in conjunction with the appended drawings wherein:

FIG. 1 is a partially broken-away enlarged sectional view of a split sleeve bearing in accordance with this invention, FIG. 2 is a sectional view of a fan-cooled dynamo-electric machine having a rotor mounted in the sleeve bearing of FIG. 1, to illustrate one method of obtaining pressurized air for the sleeve bearing, FIG. 3 is a plan view of the outer periphery of the bearing illustrating the manner for admitting oil to the bearing/shaft interface, FIG. 4 is a sectional view taken along lines 4—4 of FIG. 1, and FIG. 5 is a partially exploded plan view of a split sleeve bearing having a single integral housing seal in accordance with this invention.

A split sleeve bearing 10 in accordance with this invention is illustrated in FIG. 1 and generally comprises a bearing section 12 having housing seal sections 14 integrally formed at opposite ends thereof to intercept oil flowing axially from the bearing section along shaft 16. An axially split, annular bearing support 18 is circumferentially disposed about bearing section 12 and is spaced therefrom by step 20 along the radially outer surface of the bearing section. To inhibit rotational motion between bearing support 18 and bearing section 12, a dowel pin 22 is passed through an aperture in the bearing support into step 20 of the integral bearing-/seal.

Bearing section 12 and seal section 14 generally are formed of a unitary metallic body 24 of, for example, cast iron, steel or bronze, having an interior lining 26 of softer metal such as babbitt metal, i.e., an alloy of approximately 89 percent tin, 7.5 percent antimony and 3.5 percent copper, customarily utilized as a bearing liner because of the good conformability of babbitt metal to an adjacent surface and the ability of the metal to absorb foreign particles without scouring shaft 16. The babbitt metal customarily is centrifugally cast within metallic body 24 to form a cylindrical inner surface having an internal diameter smaller than the smallest diameter of shaft 16 underlying the composite bearing/seal. The inner surface of the babbitt metal then is cut in a single set-up in a lathe to form the interior annular grooves of the seal thereby assuring accurate concentricity between the bearing section and the housing seal section with respect to the underlying shaft diameter.

The outer perimeter of bearing section 12 remote from shaft 16 is offset at the center of the bearing section to provide an annular step 20 which is seated within annular groove 28 of bearing support 18 to limit axial movement of the composite bearing/seal. Step 20 also serves to space apart the bearing support from bearing section 12 to form dual annular passages 30 therebetween for transport of oil from the bearing (as will be more fully explained hereinafter). These annular passages are sealed by a pair of gaskets 32, e.g., of Neoprene or felt, disposed between the outer extremities of the bearing support and the radially interior seal sections 14 of the underlying composite bearing/seal. Step 20 typically extends between 20 to 40 percent of the total axial length of the composite bearing/seal while oil collection passages 30 preferably are equal to each other in area to remove the oil equally from each end of the bearing.

Housing seal sections 14 are an extension of bearing section 12 being mechanically joined thereto by neck areas 34 to form a single bearing/housing seal structure. The neck areas of the seal sections also define annular troughs 36 which axially align with shoulders 38 along shaft 16. A film of oil travelling axially along the shaft tends to coalesce into droplets at the shoulders and the droplets are thrown into annular troughs 36 by the centrifugal force of the rotating shaft. The oil then flows downwardly along the outer surface of troughs 36 and passes through apertures 40 in the neck area to annular passages 30 whereupon the oil is gravity-fed through conduits 42 to an oil sump 44 wherein the oil is reconditioned, e.g., by filtering and cooling, before being pumped back to the bearing (through suitable passages to be more fully explained hereinafter).

As can be seen in FIG. 1, the radially inner faces of housing seal sections 14 also are notched to form annular grooves 46 and 48 with grooves 48 remote from bearing section 12 preferably being at least equal or slightly larger than grooves 46 in axial span. Grooves 46 adjacent the bearing section serve as expansion regions to intercept oil passing along the shaft which was not removed by centrifugal force at shoulders 38 with any oil received within grooves 46 being returned to annular passages 30 through a plurality of angularly disposed apertures 50 communicating grooves 46 with annular passages 30.

A plurality of notches 52 also are provided along the face of the seal proximate the shaft to form a plurality of expansion regions slowing the flow of oil in an axial direction. Preferably, the edges of notches 52 are angularly disposed relative to a plane perpendicular to the axis of shaft 16 to provide a tapered surface permitting the seal to readily wear into alignment on the shaft should any eccentricity exist therebetween. Typically, the edges of notches are disposed at an angle of approximately 25°-35° relative to a vertical plane and the notches terminate in lands 54 between 0.005 and 0.20 inches wide at the radially interior surface of the housing seal section. Although the axial span of the notched region of the seal is not critical, preferably the notched regions 52a and 52c at the ends of the seal section are equal in length, e.g., about 0.5 inches, while intermediate notched region 52b is slightly larger, e.g., 0.55 inches.

Annular grooves 48 remote from bearing section 12 function as pressure equalizing chambers to provide zones inhibiting a pressure differential in the sleeve bearing tending to cause flow of oil from the bearing. As is illustrated in FIG. 2, high pressure air for grooves 48 generally can be obtained within a fan-cooled dynamoelectric machine 64 adjacent the outer periphery of the fan 56 utilized to cool the machine interior. This high pressure air then is admitted to annular grooves 48 through suitable tubing 58 to pressurize the grooves to a level substantially equal to the pressure produced at the outer periphery of the fan 56. Desirably, the cross-sectional area of air grooves 48 is at least five-fold the circumferential area of the circular zone between housing seal section 14 and shaft 16 to assure a proper pressurized seal at the outer grooves. Thus, for a clearance of 0.007 inches between a 15 inch shaft and an overlying seal section, the circumferential area of shaft clearance would be approximately equal to 0.105 sq. inches, i.e., the product of the clearance and shaft circumference, requiring a cross-sectional area of at least approximately 0.525 sq. inches for air grooves 48, e.g., 0.7 inch deep by 0.8 inch wide grooves. When more than one air inlet is provided to each air groove, the minimum cross-sectional area of the groove can be reduced by a factor equal to the number of air inlets to the grooves. The minimum cross-sectional area A for air grooves 48 therefore can be expressed by the formula:

$$A = 5 \times C \times S/I$$

wherein
  C is the circumference of the shaft in inches,
  S is the clearance between the shaft and housing seal in inches, and
  I is the number of air inlets into each air groove.

When fan 56 of dynamoelectric machine 64 does not produce a sharp pressure drop at the inboard end of bearing 10, air grooves 48 need not be pressurized. However, to maintain equal pressure within the bearing housing, it is essential that the grooves at the end of the seal have continuous access to some air source. This access can be provided simply by venting air grooves 48 to the atmosphere when the air flow produced by fan 56 does not significantly alter the pressure at the inboard end of bearing 10 from atmospheric pressure. If a balanced pressure is not maintained within the bearing housing, oil mist can tend to escape through the shaft/seal clearance at the low pressure end of the bearing.

As can be seen more clearly in FIGS. 3 and 4, oil is admitted to bearing section 12 from sump 44 through an orifice 60 communicating with a semicircular groove 62 notched within the outer periphery of the bearing section. The pressurized oil then flows upwardly within the groove under the confinement afforded by bearing support 18 to aperture 66 extending radially through bearing section 12. The oil then flows into an oil spreader 66a, i.e., a tapered shoulder extending axially along the radially interior edges of the lower half of bearing section 12 for substantially the entire length of the bearing section, whereupon the oil is drawn by rotating shaft 16 into zone 68 between the bearing section and shaft to lubricate the shaft/bearing section interface before flowing axially outward along the shaft to shoulders 38 whereat the oil is centrifugally thrown into troughs 36 for gravity return to oil sump 44 by way of apertures 40, annular passages 30 and conduits 42.

FIG. 5 shows an alternate split sleeve bearing 10a of this invention wherein only the inboard housing seal section 14a is formed integrally with the bearing section 12a, i.e., the outboard housing seal 70a is an integral annular housing seal of conventional design secured to bearing support 18a by bolts 72a passing through holes 74a in the flange of the outboard housing seal. Because the outboard seal is not integrally formed with bearing section 12a, care must be taken before tightening bolts 72a that the outboard seal is concentrically aligned with the adjacent composite bearing/housing seal. The operation and structural configuration of the split sleeve bearing 10a in all other respects is substantially identical to the operation of split sleeve 10 illustrated in FIG. 1, Because there is no axial split in outboard housing seal 70a, the opportunity for oil leakage through the seal is reduced relative to split bearings. The sleeve bearing construction of FIG. 5 typically is used when access to the outboard end of the machine permits removal of the outboard housing seal axially from shaft 16a.

Although various embodiments of the invention have been illustrated and described, it will be evident that other variations of the bearing and integral seal of this invention can be employed. For example, the high pressure air zones at the outer edges of the sealed bearing can be omitted or the bearing support could be terminated short of the seal section of the composite unit with the oil being returned directly from annular grooves 36 and 46 to oil sump 44. Similarly, the bearing support could be designed with an oil reservoir and an associated oil ring lubrication system wherein rings dipping into the reservoir transfer oil to the bearing section.

What I claim as new and desire to secure by Letters Patent of the United States is:

1. A sleeve bearing for a shaft axially rotatable therein comprising a bearing section having an internal cylindrical surface concentrically disposed about a portion of said shaft, housing seal sections integrally formed at both axial ends of said bearing section, each said housing seal section having a plurality of annular channels for removal of lubricant flowing axially from said bearing section, aperture means passing through said seal sections to communicate the axially outer annular channel at each end of said seal sections with a source of air to maintain a balanced pressure in said sleeve bearing, the cross-sectional area of said outer channel being at least five-fold the circumferential area of the annular region between the shaft and the radially interior face of the housing seal sections divided by the number of air inlets into the channel, the face of said seal sections intermediate said channels being provided with a plurality of notches having edges angularly disposed relative to a plane perpendicular to the axis of said sleeve bearing, said notches terminating in a land at the radially interior surface of the housing seal sections, a stationary bearing support circumferentially disposed about said bearing sections, means securing said bearing support to said bearing section to inhibit rotational motion therebetween, said bearing support extending axially beyond said bearing section to overly the housing seal sections located at opposite ends of said bearing section, a step positioned along the exterior surface of said bearing section, said step being received within a notch formed along the interior surface of said bearing support to inhibit axial movement of said bearing section relative to said bearing support and to space said bearing section from said bearing support to form dual annular chambers for removal of lubricant from the sleeve bearing, aperture means communicating the annular channels axially interior of the air communicated channel with said annular chambers to gravitationally return lubricant from said annular channels to said dual chambers, means for admitting lubricant into an an annular region between said bearing section and said shaft, said lubricant admission means including aperture means for passing lubricant into an arcuate region between said bearing support and said bearing section, second aperture means for admitting lubricant to the interface between the shaft and the bearing section and spreader means for axially distributing lubricant along said shaft/bearing section interface.

2. A sleeve bearing with an integral seal for a shaft axially rotatable therein, said bearing comprising an axially split bearing section having an internal cylindrical surface concentrically disposed about a portion of said shaft, an axially split housing seal section integrally formed on the axially interior end of said bearing section, said housing seal section having annular channels for removal of lubricant flowing axially from said bearing section, aperture means passing through said housing seal section to communicate the axially outer annular channel of said seal section with a source of air to maintain a balanced pressure in said sleeve bearing, the cross-sectional area of said outer channel being at least five-fold the circumferential area of the annular region between the shaft and the radially interior face of the housing seal section divided by the number of air inlets into the channel, a stationary bearing support circumferentially disposed about said bearing section, means for securing said bearing support to said bearing section to inhibit rotational motion therebetween, said bearing support extending axially beyond said bearing section to overlie the housing seal section located at the axially interior side of said bearing section, a step positioned along the exterior of said bearing section, said step being received within a notch formed along the interior of said bearing support to inhibit axial movement of said bearing support relative to said bearing section, an integral annular housing seal fixedly secured by mechanically removable members to the axially outer end of said bearing support, said integral annular seal having at least one lubricant intercepting channel and an air channel to maintain a balanced pressure in said sleeve bearing, aperture means communicating the lubricant intercepting channel in the housing seal section and said integral annular housing seal with annular chambers formed between said bearing support and said bearing section to gravitationally return lubricant from said lubricant removal channels to said dual chambers, means for introducing lubricant into the annular region between said bearing section and said shaft, said lubricant admission means including aperture means for passing lubricant into an arcuate region between the bearing support and the bearing section, second aperture means for admitting lubricant into the interface between said shaft and said bearing section and spreader means for axially distributing lubricant along said shaft bearing section interface.

* * * * *